(No Model.)
W. L. DAVIS & B. F. LEACH.
DEVICE FOR PREVENTING THE REFILLING OF BOTTLES.
No. 527,777. Patented Oct. 23, 1894.
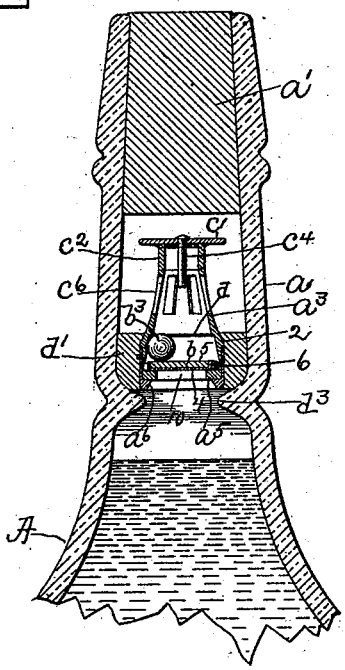
Fig. 1.
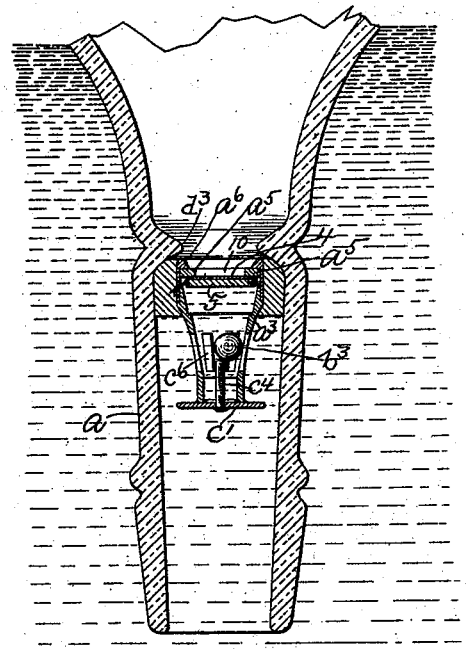
Fig. 3.
Fig. 2.
Fig. 4.
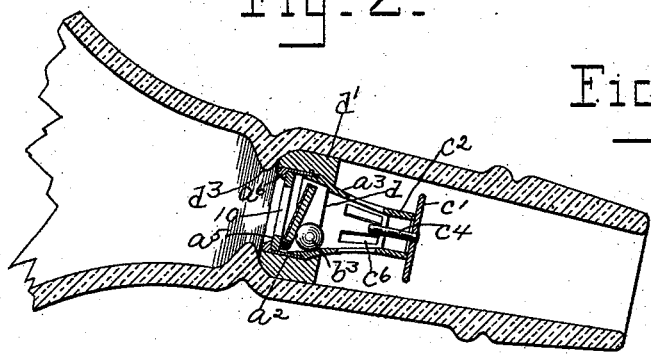
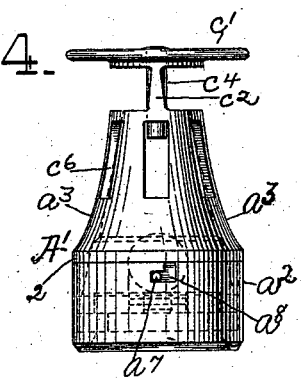
Fig. 5.
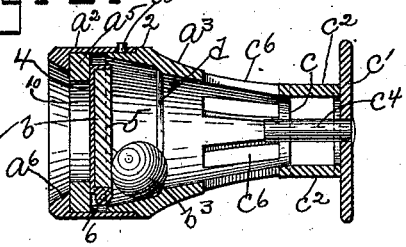
Witnesses.
John F. Nelson
J. Murphy
Inventors
William L. Davis
Benjamin F. Leach
by Jas. H. Churchill
Atty.
THE NORRIS PETERS CO., PHOTO-LITHO., WASHINGTON, D. C.

UNITED STATES PATENT OFFICE.

WILLIAM L. DAVIS, OF BOSTON, MASSACHUSETTS, AND BENJAMIN F. LEACH, OF LOUISVILLE, KENTUCKY.

DEVICE FOR PREVENTING THE REFILLING OF BOTTLES.

SPECIFICATION forming part of Letters Patent No. 527,777, dated October 23, 1894.

Application filed April 19, 1893. Serial No. 470,992. (No model.)

*To all whom it may concern:*

Be it known that we, WILLIAM L. DAVIS, of Boston, in the county of Suffolk and State of Massachusetts, and BENJAMIN F. LEACH, of Louisville, in the county of Jefferson and State of Kentucky, have invented an Improvement in Devices for Preventing the Refilling of Bottles, of which the following description, in connection with the accompanying drawings, is a specification, like letters and figures on the drawings representing like parts.

This invention relates to a device or stopper for preventing the refilling of bottles and like vessels, and is especially adapted to be used in bottles containing superior grades of liquors, colognes, extracts and like liquids.

Prior to this invention, we are aware that devices have been made for the purpose specified, but such devices have been unsatisfactory on account of not working under all conditions, and also on account of the expense required to equip the bottles with the same.

It is the object of this invention, to provide a simple and inexpensive device, which will work under all conditions and will prevent the bottle being filled, no matter at what angle the bottle may be held, or whether the bottle is immersed in the liquor or the latter is being forced into the bottle.

In accordance with this invention, a shell or casing provided with ports or outlets at or near its opposite ends, contains within it a valve, which may and preferably will be made in the form of a disk, and which, for the best results, is hinged or permanently attached to the said casing or shell on its inner side, the said valve co-operating with a valve seat on the inner side of the casing or shell to close one port or opening of the said casing or shell. The casing or shell has one end made conical or inclined on its inner side, and within the conical portion of the shell or casing is located a weight preferably a ball, which co-operates with the valve to close the same when the bottle is held in various positions or angles, as will be described. The conical portion of the shell or casing, at its discharge or outlet end, may and preferably will be made of substantially the same area as the diameter of the ball, and to permit of a free discharge of the liquor when the bottle is turned in the act of pouring, the ball is held away from the outlet port or end of the conical portion of the shell by an arresting or stopping device, attached to the casing or shell and extended into the same so as to arrest the weight or ball and prevent it closing the outlet port of the conical portion of the case or shell. The conical portion of the shell is provided on its inner side with a shoulder or ridge for a purpose as will be described.

The case or shell referred to, is composed of a lower portion, and an upper portion having an inclined inner surface and attached at its base to the lower portion, the parts being capable of being constructed of sufficiently small diameter to enable the entire device to be located within the neck of the bottle below the usual cork or stopper, and it may be held in place by a cork or other jacket, the neck of the bottle being contracted to form an opening of less diameter than the mouth of the bottle for a purpose as will be described. These and other features of this invention will be pointed out in the claims at the end of this specification.

Figure 1, is a vertical section of a sufficient portion of a bottle provided with a device or stopper embodying this invention, to enable it to be understood, the bottle being shown in its normal or vertical position and as filled with liquor. Fig. 2, represents the bottle shown in Fig. 1, as tipped or inclined from a horizontal position. Fig. 3, represents the bottle shown in Fig. 1 as inverted and immersed in liquor; Fig. 4, a side elevation on an enlarged scale of the stopper or device removed from its jacket, and Fig. 5, a sectional detail on an enlarged scale of the device in a horizontal position.

The vessel A, herein represented as a bottle such as commonly used to contain spirituous and other liquors, may be of any usual or desired construction, it being usually made of glass. The bottle A in the present instance is shown as provided with a substantially long neck $a$ and with the usual cork or stopper $a'$. The neck $a$ of the bottle has located in it below the cork $a'$, a device or auxiliary stopper constructed to permit of the free discharge of the contents of the bottle, and to prevent liquor being admitted into the bottle after the said device or auxiliary stopper has been inserted into the bottle.

The device or auxiliary stopper referred to, is preferably constructed as herein shown, and consists of a shell or casing $A'$, which, for the best results, is made in two parts $a^2\, a^3$ detachably connected together as will be described. The part $a^2$ of the casing or shell may be made cylindrical, as herein shown, and will be hereinafter referred to as the lower part and is provided on its inner side with an annular ring $a^5$ forming a port or opening 10 and which, for simplicity of construction, is preferably made separate from the part $a^3$ and secured thereto by forcing the ring $a^5$ onto the part $a^2$ and preferably against a flange or projection $a^6$ forming part of the cylinder $a^2$. The part $a^3$ of the shell or casing which will hereinafter be referred to as the upper part is preferably made cylindrical at its base or lower portion as at 2, and its upper portion is made substantially conical or tapering in form, the portion 2 of the part $a^3$ of the said shell being provided as shown, with a projection or pin $a^7$ adapted to engage a right angled cut or slot $a^8$ in the part $a^2$, to form a bayonet joint or locking device by which the parts $a^2\, a^3$ may be securely but detachably fastened together the conical portion of the case or shell being thus secured or attached to the lower portion at the base of the cone.

The shell or casing, in accordance with our invention, contains within it a valve $b$ preferably a flat or disk valve designed to cooperate with and close the port opening 10, the said valve in the present instance being represented as made of two parts 4, 5. The part 4 may be of metal and hinged or pivotally connected to the ring $a^5$, as at 6, and the part 5 may be of cork, which is secured to the part 4 in any desired manner. The shell or casing also contains within it a movable weight shown as a ball $b^3$, which co-operates with the valve $b$, as will be described. The upper portion of the part $a^3$ is provided with a liquid outlet or port $c$ and as herein shown, the said outlet is protected by a cap $c'$ attached to the conical part $a^3$ of the shell or casing by webs or pieces $c^2$ herein shown as substantially diametrically opposite, the said webs and cap being preferably made in one piece with the part $a^3$, and of substantially little thickness, so that the cap will become detached from the part $a^3$, when pulled upon with substantially little force. The ball or weight $b^3$ is arrested in its movement toward the outlet of the conical part $a^3$ by a stop $c^4$, shown as a pin or rod secured to the cap $c'$ and extended into the conical part $a^3$ below or beyond the outlet $c$, but if desired, the pin or rod may be extended into the conical part through its side. The conical part $a^3$ may be provided near its discharge or outlet end with one or more auxiliary outlets or ports $c^6$. The conical part $a^3$ on its inner side is provided with an annular shoulder or ridge $d$, which may be formed as herein represented by making the bottom or lower portion of the conical part $a^3$ on its inner side, of greater diameter than the upper portion, so that the device or auxiliary stopper must be turned beyond a horizontal position so as to obtain a substantially great incline of the device, before the ball will roll over the said shoulder or ridge, for a purpose as will be described.

The shell or case and its attached cap are made of less diameter than the mouth of the bottle so that it may be inserted into the neck of the bottle or other vessel, a sufficient distance below its mouth to permit the bottle to be closed by the cork $a'$. The case or shell is held in place in the neck of the bottle by means of a jacket $d'$ of cork or other material, which is forced into the neck of the bottle by means of a hollow plunger or suitable instrument, and the said jacket is made to fit tight within the neck of the bottle so as to require a greater power to withdraw it than can be obtained with an instrument capable of being inserted into the neck of the bottle to grasp any exposed part of the casing $A'$, and in order to prevent the device being forced into the bottle, the diameter or interior of the neck portion of the bottle is contracted as at $d^3$, to form an opening of less diameter than the mouth of the bottle, and which opening is not sufficiently wide to permit the shell to pass therethrough if it should be attempted to force the shell through the jacket. The cap $c'$ will preferably be made of substantially large diameter to prevent the insertion, between it and the neck of the bottle, of wires of sufficient strength and size to do any harm to the device and by reason of the fact that the said cap is secured to the conical part of the casing $A'$ by the thin webs $c^2$, a slight power applied to the cap, as by an instrument inserted into the neck of the bottle, will detach the cap, thereby rendering it plainly evident that the device was being tampered with. When power is applied to the cap $c'$ as described, the said cap will be broken off from the webs $c^2$ because the casing $A'$ is secured so tightly or firmly in the neck of the bottle by the jacket $d'$ as to prevent its being removed except by digging the cork jacket out in small pieces, thereby destroying the entire device.

In practice, the parts $a^2\, a^3$ are fitted together with the ball and valve in them and inserted into the jacket $d'$, and after the bottle is filled, the jacket may be forced into place against the contracted portion $d^3$ by means of a hollow plunger.

In the operation of the device, the valve $b$ is closed by gravity assisted by the ball $b^3$, when the bottle is standing upright or in its normal position, and when tipped, the liquor in the bottle flows through the port opening 10 into the conical part $a^3$, from which it may pass out through the outlet port or opening $c$ and the auxiliary port openings $c^6$, into the neck of the bottle.

By an inspection of Fig. 1, it will readily be seen, that it would be impossible to pour liquor into the bottle when the latter is in a vertical position, and if the bottle should be laid down flat in a horizontal position, liquor could not be forced or flowed into the bottle, by reason of the valve being held closed by the ball, which in the horizontal position of the bottle is caused to lie against the valve by the inclined inner portion of the conical part $a^3$. If the bottle is turned from a horizontal position into an inclined position, the ball will lie against the valve and hold the latter to its seat, until the inclination is made sufficiently great to overcome the taper or inclination of the part $a^3$ below the shoulder or ridge $d$, and when the inclination of the bottle is sufficient to cause the ball to roll against the shoulder or ridge $d$, the check valve $b$ is only slightly opened as shown in Fig. 2, but at such time, the neck of the bottle is depressed below the point at which the bottle can be filled by flowing the liquor into it, owing to the formation of a water seal or lock by which the air in the bottle is prevented from escaping. If pressure is used, the force of liquor will close the valve. If the bottle is turned sufficiently to cause the ball to pass over the ridge or shoulder and thereby permit the valve $b$ to become wide open, either by inclining it more than shown in Fig. 2 or by inverting it as shown in Fig. 3, the cap would prevent the introduction of any tube or device by which the air might be withdrawn from the bottle. Furthermore, if tipped at a greater angle than that shown in Fig. 2, the valve when made of cork as herein represented would float and lift the valve to its seat, but by means of the cap attached to the shell and located at a considerable distance below the mouth of the bottle, the cork portion of the valve may be dispensed with and the said valve made of other suitable material, such as thin metal, as it would be impracticable to insert a wire or other device into the shell so as to reach the valve, owing to the fact that the auxiliary ports $c^6$ may be made substantially small and located near the end of the shell so as to be protected by the cap, and on account of the narrow passage between the cap and the interior of the neck of the bottle. Furthermore, the auxiliary ports may be entirely omitted if desired and the open mouth or end of the conical part $a^3$ may alone form the discharge or outlet for the shell.

While the device remains intact as shown in the drawings, the cap $c'$ is the only part which can be grasped or engaged by any instrument which may be inserted into the neck of the bottle, and if such an instrument should be inserted and power applied to withdraw the device, the cap would be pulled off and would be thus detached from the casing, the absence of which from the bottle would serve to notify customers or other persons, that the bottle had been tampered with. The removal of the cap does not diminish the effectiveness of the device as a preventive against refilling the bottle, for the operative parts still remain undisturbed in the neck of the bottle. If now it should be attempted to remove the device by engaging the conical part 2 of the casing A', the power applied would still be insufficient to remove the device, for the reason that the jacket $d'$ holds the device firmly and the said jacket is wedged or forced into the bottle with great pressure, and this when coupled with the expansive reaction or movement of the jacket, prevents it being removed by a force which can be applied through the substantially long neck of the bottle.

We claim—

1. A device for preventing the refilling of bottles or other vessels, consisting of a hollow casing or shell composed of a lower portion having a port opening, and an upper portion having an inclined inner surface attached at its base to the lower portion and provided with a port opening, a valve in said casing or shell, a weight or ball in said case or shell to act on said valve, a jacket encircling the case or shell at the junction of the upper portion to the lower portion, and a cap for the upper portion insecurely attached to the said upper portion to permit the said cap to be detached without effecting the withdrawal of the upper portion from the said jacket, substantially as described.

2. A device for preventing the refilling of bottles or other vessels, consisting of a hollow case or shell composed of an upper part provided with an inclined or conical inner surface and a lower part attached to the base of the upper part, port openings at the opposite end of said hollow case or shell, a valve in said hollow case or shell co-operating with the port in one of said parts, a ball or weight to act on said valve, a cap supported above the conical part and insecurely attached to the said conical part, a stop or arresting device to engage the said ball and limit its movement toward the end of the conical part, and a jacket encircling the said parts at the point of juncture and supporting the hollow case within the neck of a bottle below its mouth against force applied to the detachable cap, substantially as described.

3. A device for preventing the refilling of bottles or other vessels, consisting of a hollow case or shell having one end made conical on its inner side and provided with a shoulder or ridge on the inner conical surface, port openings in the case or shell at or near its opposite ends, a valve to co-operate with one of said port openings, a ball or weight to act on said valve and arrested in its movement in one direction by the said shoulder or ridge, substantially as and for the purpose specified.

4. A device for preventing the refilling of bottles or other vessels, consisting of a case or shell having one end made conical or inclined on its inner surface and provided with port openings, a check valve in said case or shell co-operating with one of said openings, a ball or weight to normally hold said valve to its seat, a stop to arrest the movement of the ball away from the said valve, and a cap attached to the shell, the said shell and cap being made of less diameter than the neck of the bottle to permit the same to be inserted into the said neck below its mouth, and a jacket for said shell to hold the device within the neck of the bottle, substantially as described.

5. A device for preventing the refilling of bottles or other vessels consisting of a case or shell composed of one portion provided with a conical inner surface and a second portion attached to the conical portion at the base of the conical portion, port openings in the said case or shell at its opposite ends, a disk valve in said case co-operating with one of said ports, a ball or weight to act on said valve, a cap insecurely attached to the conical portion of the case or shell, and a jacket encircling the lower portion of the case or shell and forming the support for the same, substantially as described.

6. A device for preventing the refilling of bottles or other vessels consisting of a hollow case or shell composed of a lower part $a^2$ and a conically-shaped upper part $a^3$ detachably secured at its base to the lower part $a^2$ and supported by the said lower part, a port opening in each of the said parts, a disk valve in said case or shell controlling one of said ports, a ball or weight in said case co-operating with the said disk valve, and a jacket surrounding the lower portion of the case or shell, substantially as described.

7. In a device for preventing the refilling of bottles or other vessels, a hollow case or shell provided with a conical upper portion open at its apex or top to form an outlet port $c$, a cap of less diameter than the mouth of the bottle supported above the said apex, webs $c^2$ joining said cap to the conical portion to leave lateral port openings forming a continuation of the outlet port $c$, a lower portion of the case or shell attached to the base of the conical upper portion and provided with a port opening, a valve co-operating with the said port opening, a weight or ball located in the case or shell and co-operating with the said valve, and a jacket surrounding the case or shell at the junction of the lower portion with the base of the conical upper portion, substantially as described.

In testimony whereof we have signed our names to this specification in the presence of two subscribing witnesses.

WILLIAM L. DAVIS.
BENJAMIN F. LEACH.

Witnesses:
JAS. H. CHURCHILL,
J. MURPHY.